United States Patent
Kariya

(10) Patent No.: US 9,784,556 B2
(45) Date of Patent: Oct. 10, 2017

(54) ROTATION DETECTOR DETECTING ROTATION OF ROTATING MACHINE AND SYSTEM PROVIDED WITH ROTATION DETECTOR

(71) Applicant: FANUC CORPORATION, Yamanashi (JP)

(72) Inventor: Isao Kariya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 35 days.

(21) Appl. No.: 14/288,459

(22) Filed: May 28, 2014

(65) Prior Publication Data
US 2014/0354272 A1  Dec. 4, 2014

(30) Foreign Application Priority Data

May 29, 2013  (JP) .................................. 2013-113148

(51) Int. Cl.
*G01B 7/14* (2006.01)
*G01D 5/244* (2006.01)

(52) U.S. Cl.
CPC ........... *G01B 7/14* (2013.01); *G01D 5/24442* (2013.01)

(58) Field of Classification Search
CPC ...... G01D 5/145; G01D 5/2457; G01D 5/147; G01B 7/14
USPC ......................................... 324/207.2, 207.25
See application file for complete search history.

(56) References Cited

U.S. PATENT DOCUMENTS

| | | | | |
|---|---|---|---|---|
| 5,501,110 A | * | 3/1996 | Peilloud ................ | G01D 5/145 324/207.2 |
| 7,400,141 B2 | * | 7/2008 | Taniguchi ............ | G01D 5/2457 29/893.3 |
| 7,896,552 B2 | * | 3/2011 | Nakamura ............. | G01D 5/145 29/602.1 |
| 2005/0285592 A1 | | 12/2005 | Taniguchi et al. | |

FOREIGN PATENT DOCUMENTS

| | | |
|---|---|---|
| DE | 69420781 T2 | 5/2000 |
| EP | 0539602 A1 | 11/1992 |
| EP | 0539602 A1 | 5/1993 |

(Continued)

OTHER PUBLICATIONS

English Machine Translation for Japanese Patent Publication No. 08-262048 published Oct. 11, 1996, 10 pages.

(Continued)

*Primary Examiner* — Melissa Koval
*Assistant Examiner* — Rahul Maini
(74) *Attorney, Agent, or Firm* — Fredrikson & Byron, P.A.

(57) ABSTRACT

A rotation detector which can improve the manufacturing efficiency of a rotating machine. The rotation detector is provided with a connecting part which is fastened in contact with a rotating part of the power part, an output shaft which extends from the connecting part to one side in the axial direction, and a moving part which is comprised of a connecting part and output shaft and, further, has a detected region which is formed at a maximum outer circumferential surface of the connecting part and output shaft, and a fixed part which is fastened to the connecting part at the outside in the radial direction and which detects a change in magnetic field which is generated along with rotation of the detected region.

7 Claims, 7 Drawing Sheets

(56) References Cited

FOREIGN PATENT DOCUMENTS

| | | | |
|---|---|---|---|
| JP | 63217221 A | 9/1988 | |
| JP | 04-335111 A | 11/1992 | |
| JP | EP 0539602 A1 * | 5/1993 | ............ G01D 5/147 |
| JP | 08-262048 A | 10/1996 | |
| JP | 09272033 A | 10/1997 | |
| JP | 2001286101 A | 10/2001 | |
| JP | 2003-337051 A | 11/2003 | |
| JP | 2004157056 A | 6/2004 | |
| JP | 2004239873 A | 8/2004 | |
| JP | 2005274176 A | 10/2005 | |
| JP | 2006010436 A | 1/2006 | |
| JP | 2013053990 A | 3/2013 | |

OTHER PUBLICATIONS

English Machine Translation for Japanese Publication No. 2003-337051 published Nov. 28, 2003, 7 pages.
English Abstract and Machine Translation for German Publication No. 694 20 781 T2, published May 18, 2000, 11 pgs.

* cited by examiner

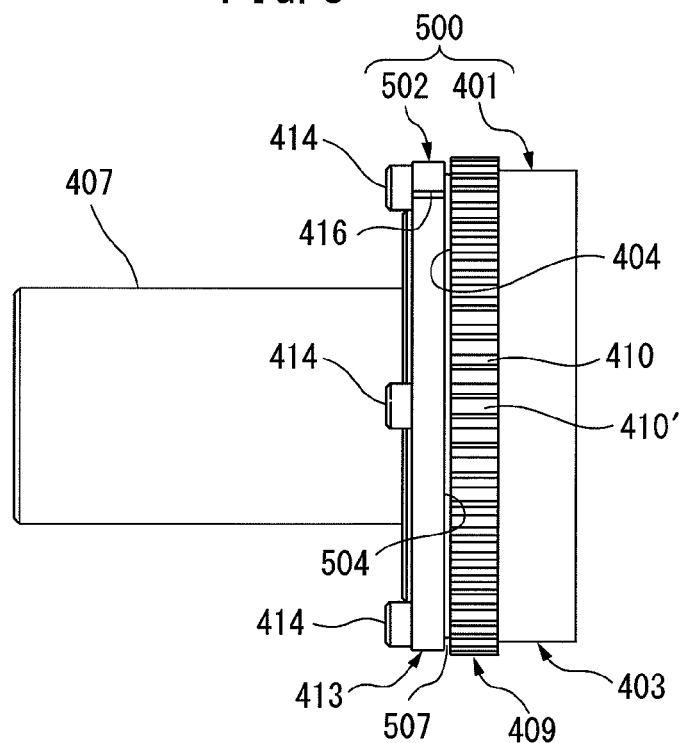
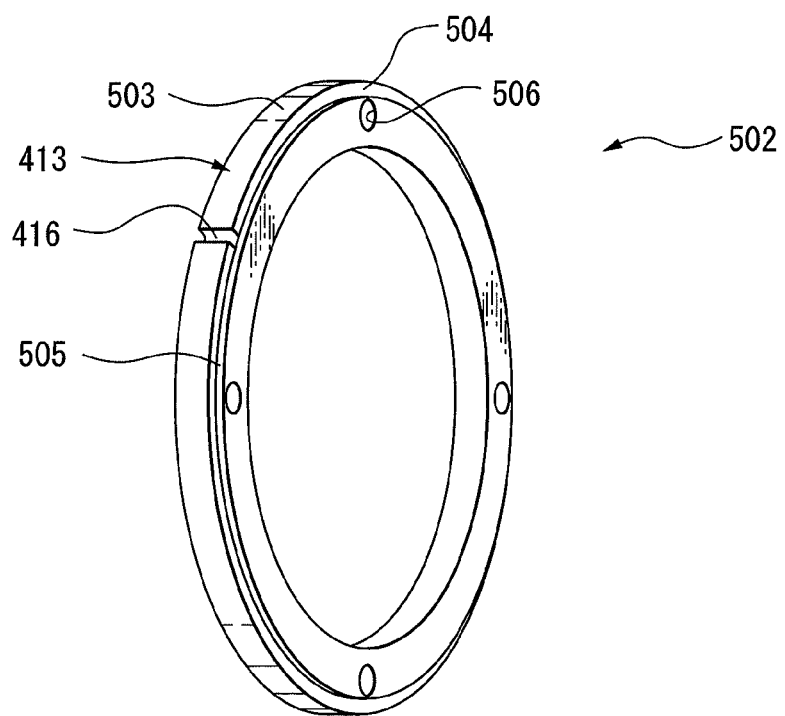

ROTATION DETECTOR DETECTING ROTATION OF ROTATING MACHINE AND SYSTEM PROVIDED WITH ROTATION DETECTOR

BACKGROUND OF THE INVENTION

1. Field of the Invention

The present invention relates to a rotation detector which detects rotation of a rotating machine and a system which is provided with a rotation detector.

2. Description of the Related Art

In the field of servo motors and other rotating machines, it is known to install a rotation detector for obtaining information relating to rotation such as the rotational speed, rotational angle, etc., of the rotating machine (for example, see Japanese Patent Publication No. 2006-10436A). This rotation detector is provided with a moving part which rotates together with an output shaft of the rotating machine and a fixed part which is fastened at the outside of the moving part in the radial direction and which detects a change of a magnetic field which occurs along with rotation of the moving part.

In a conventional rotating machine, the moving part of the rotation detector has been made as a member independent from the rotating part of the rotating machine. Therefore, to secure the performance of the rotation detector, when assembling the rotating machine, precisely positioning the moving part of the rotation detector with respect to the rotating part of the electric motor is necessary. Due to this, it is complicated and improvement of the manufacturing efficiency becomes difficult.

Specifically, the detected part of a rotation detector for which high precision positioning is demanded must be produced separately as an independent ring member separate from the rotation output member which is fastened to the rotating part of the rotating machine. This ring member is fit over the rotation output member when assembling of the rotating machine.

When assembling, the rotation output member which is fastened to the rotating part of the rotating machine is fastened to the rotating part so as to become concentric with the rotating part of the rotating machine, then the ring member at which the detected part is provided is fastened to the rotation output member so as to become concentric with the axis of rotation. Therefore, two steps of precise centering are necessary. Due to this, the assembly process of the rotating machine is complicated and the manufacturing efficiency of the rotating machine is reduced.

The present invention, in consideration of the above problem, has as its object the provision of a rotation detector which can improve the manufacturing efficiency. Further, the present invention has as another object the provision of a system which is provided with a rotating machine and a rotation detector which can improve the manufacturing efficiency.

SUMMARY OF THE INVENTION

As one aspect of the present invention, a rotation detector for detecting rotation of a rotating machine, comprising a moving part including a connecting part fastened in contact with a rotating part of the rotating machine; an output shaft extending from the connecting part to one side in the axial direction; and a first detected part formed at a first outer circumferential surface which has a maximum outside diameter in the connecting part and the output shaft; and a fixed part fastened separated from the first outer circumferential surface at the outside in the radial direction, and detecting a change in a magnetic field which occurs with rotation of the first detected part is provided.

Further, an end face of the output shaft at the one side in the axial direction and an end face at the connecting part at the other side in the axial direction positioned opposite to that end face may be provided with a hole or a projection which is concentric with the center of the output shaft and first outer circumferential surface.

The rotation detector may further comprise a ring-shaped second moving part which is made as a separate member from the moving part, and which is fastened to the moving part. The second moving part may have a second detected part at a second outer circumferential surface of the second moving part. In this case, the first detected part may include a plurality of recesses or projections which are formed at the first outer circumferential surface so as to be arranged at equal intervals in the circumferential direction, while the second detected part may include a single recess or projection which is formed at the second outer circumferential surface. The fixed part detects a change in the magnetic field which occurs with rotation of the first detected part and second detected part.

Further, as a second aspect, the moving part may have a second detected part which is integrally formed with the first detected part so as to adjoin it in the axial direction. In this case, the first detected part may include a plurality of recesses or projections which are formed at the first outer circumferential surface so as to be arranged at equal intervals in the circumferential direction, while the second detected part may include a single recess or projection which is formed at the first outer circumferential surface. The fixed part detects a change in the magnetic field which occurs with rotation of the first detected part and second detected part. Further, a groove may be formed between the first detected part and the second detected part so as to extend in the circumferential direction over the entire first outer circumferential surface.

BRIEF DESCRIPTION OF THE DRAWINGS

The above and other objects, features, and advantages of the present invention will become clearer from the following description of preferred embodiments with reference to the attached drawings, in which:

FIGS. 5A and 5B are views of a moving part according to still another embodiment of the present invention, wherein FIG. 5A is a front perspective view and FIG. 5B is a back perspective view, FIG. 8 is a side view of a moving part assembly according to still another embodiment of the present invention, FIG. 9 is a perspective view of a second moving part which is shown in FIG. 8.

DETAILED DESCRIPTION

Figure 1:
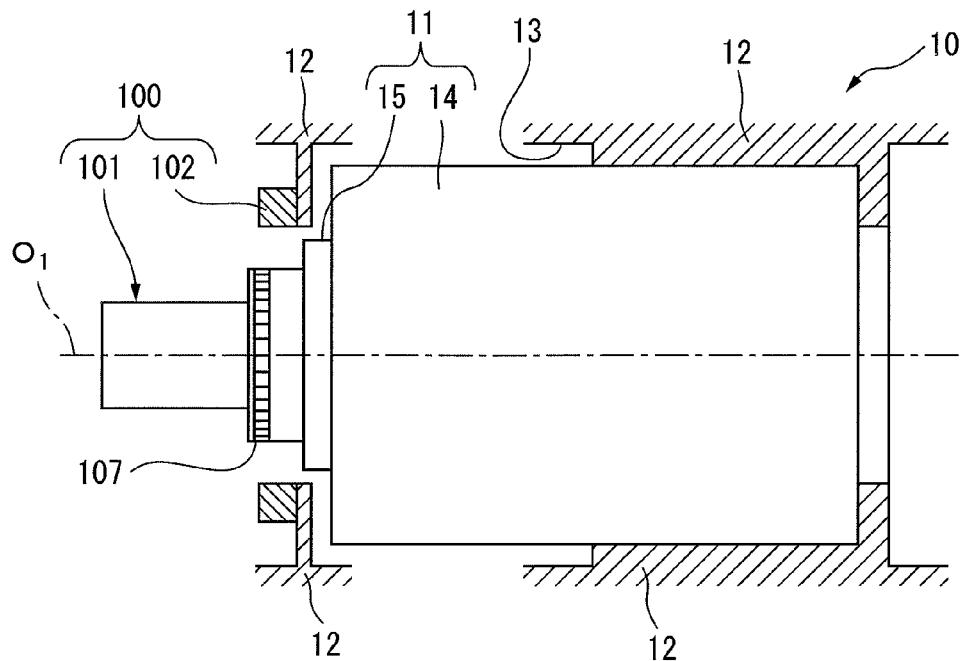
FIG. 1 is a side view of a system according to an embodiment of the present invention.

Below, embodiments of the present invention will be explained in detail based on the drawings. First, referring to FIG. 1, the configuration of a system 10 according to one embodiment of the present invention will be explained. Note that, in the following explanation, the rotation axis $O_1$ of the electric motor 11 is the axial direction, the left direction in FIG. 1 is the front in the axial direction, and the right direction in FIG. 1 is the back in the axial direction.

The system 10 is provided with an electric motor 11 which is set inside of a housing 12 and a rotation detector 100 for detecting rotation of the electric motor 11. The electric motor 11 is a servo motor or other such motor which is electrically controlled and is fastened in a space 13 which is defined at the inside of the housing 12.

The electric motor 11 has a power output part 14 which generates rotational force and a rotating part 15 which outputs rotation which is generated by the power output part 14. The power output part 14 includes a stator (not shown), and a rotor (not shown) disposed to be able to rotate. A coil is wound around the surface of the stator. Further, the rotor includes magnets.

If current flows to this coil from a power source which is set at the outside (not shown), the stator causes a rotating magnetic field to be formed around the axis $O_1$. The rotor receives electromagnetic force in the circumferential direction due to the rotating magnetic field which is generated by the stator. As a result, the rotor rotates around the shaft.

The rotating part 15 is mechanically coupled to the rotor of the power output part 14 and rotates together with the rotor. The rotating part 15 is attached to the power output part 14 so as to extend to the outside of the power output part 14 and to be able to rotate.

The rotation detector 100 has a moving part 101 which is fastened to the rotating part 15 of the electric motor 11; and the fixed part 102 which is fastened separated from the moving part 101 to the outside in the radial direction. The moving part 101 rotates together with the rotating part 15.

Next, referring to FIG. 2 and FIG. 3, the configuration of the moving part 101 according to the present embodiment will be explained. The moving part 101 is made of e.g., iron or another ferromagnetic material. The moving part 101 has a columnar-shaped connecting part 103 which is fastened in contact with the rotating part 15 of the electric motor 11 shown in FIG. 1; and a columnar-shaped output shaft 105 which extends from an end face 104 of the connecting part 103 at the front in the axial direction toward the front in the axial direction. The connecting part 103 and output shaft 105 are arranged concentrically with each other and have a common center axis $O_2$.

Note that, in the assembled state as shown in FIG. 1, the moving part 101 is fastened to the rotating part 15 of the electric motor 11 so that the center axis $O_2$ of the moving part 101 and the rotation axis $O_1$ of the electric motor 11 match each other. The output shaft 105 has a diameter smaller than the connecting part 103 and a length in the axial direction longer than the connecting part 103. The output shaft 105 is a member which outputs the rotational force generated by the power output part 14 to an external equipment (for example, a robot arm) which is connected to the electric motor 11.

At the outer circumferential surface of the part which has the maximum outside diameter in the moving part 101, a detected region 107 is formed. In the present embodiment, the part having the maximum outside diameter in the moving part 101 is a stepped part 112 provided at the connecting part 103. The detected region 107 is formed on the outer circumferential surface of this stepped part 112. The detected region 107 includes a second detected part 108 formed adjacent to the end face 104 of the connecting part 103; and a first detected part 109 formed adjacent to the second detected part 108 at the back in the axial direction of the second detected part 108.

At the first detected part 109, a plurality of recesses 111' which are inwardly recessed from the outer circumferential surface of the stepped part 112 of the connecting part 103 and projections 111 which have outside diameters the same as the stepped part 112 are formed so as to be alternately arranged. Each of the projections 111 of the first detected part 109 has the same width in the circumferential direction. The projections 111 are formed so as to be arranged at substantially equal intervals in the circumferential direction over the entire stepped part 112 of the connecting part 103. On the other hand, at the second detected part 108, only a single projection 110 which has an outside diameter the same as the stepped part 112 of the connecting part 103 is formed.

Note that, in the present embodiment, the projection 110 of the second detected part 108 is formed so as to continuously extend from one of the projections 111 of the first detected part 109. In other words, the projection 110 and the corresponding single projection 111 are formed by a single projection which extends in the axial direction. The center of the stepped part 112 is arranged to be concentric with the center axis $O_2$. In other words, the center of curvature of each of the outer surface of the projection 110 matches with the center axis $O_2$.

The dimensions of the projections 110 and 111 which constitute the detected region 107, such as the width in the axial direction, height in the radial direction, and radius of curvature of the stepped part 112, are strictly controlled with predetermined tolerances. In particular, the projections 111 of the first detected part 109 are formed for example by using a CNC machine tool to cut the stepped part 112 of the connecting part 103 by a method controlled to a high precision while strictly controlling them in dimensions.

A total of four mounting holes 113 are formed on the end face 104 of the connecting part 103 so as to be arranged at substantially equal intervals in the circumferential direction. The moving part 101 is fastened to the rotating part 15 of the electric motor 11 via four bolts which are passed through the mounting holes 113 and screwed into the rotating part 15 of the electric motor 11.

Referring again to FIG. 1, the fixed part 102 is supported by the housing 12 so as to be separated from the detected region 107 provided at the moving part 101 by a predetermined distance (for example, 0.1 mm) to the outside in the radial direction. The fixed part 102 has magnets (not shown) which are arranged at the outside in the radial direction of the detected region 107 and magnetoresistance elements (not shown) which are arranged between the detected region 107 and the magnets.

A magnetoresistance element is a resistance element which changes in resistance value in accordance with the intensity of the magnetic field in which the element is placed. A bias voltage is applied between the two terminals of this magnetoresistance element. The voltage of the magnetoresistance element is detected as the output voltage. The fixed part 102 detects the change in the output voltage of the magnetoresistance element at this time to thereby detect the change in magnetic field which is generated along with the rotation of the detected region 107.

Figure 2:
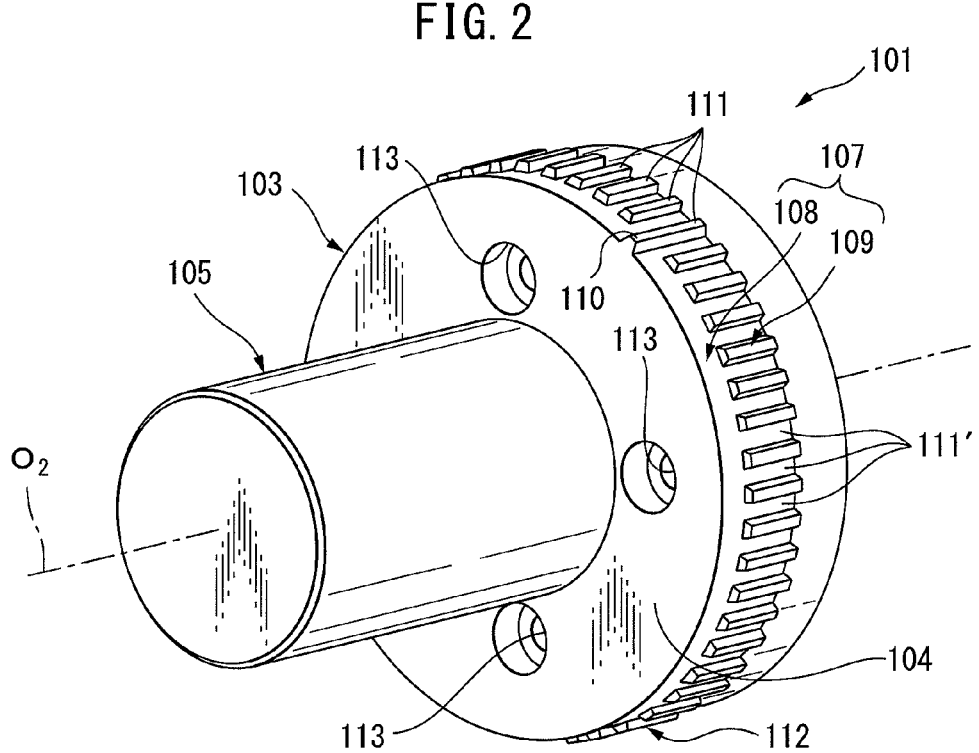
FIG. 2 is a perspective view of a moving part which is shown in FIG. 1.
Figure 3:
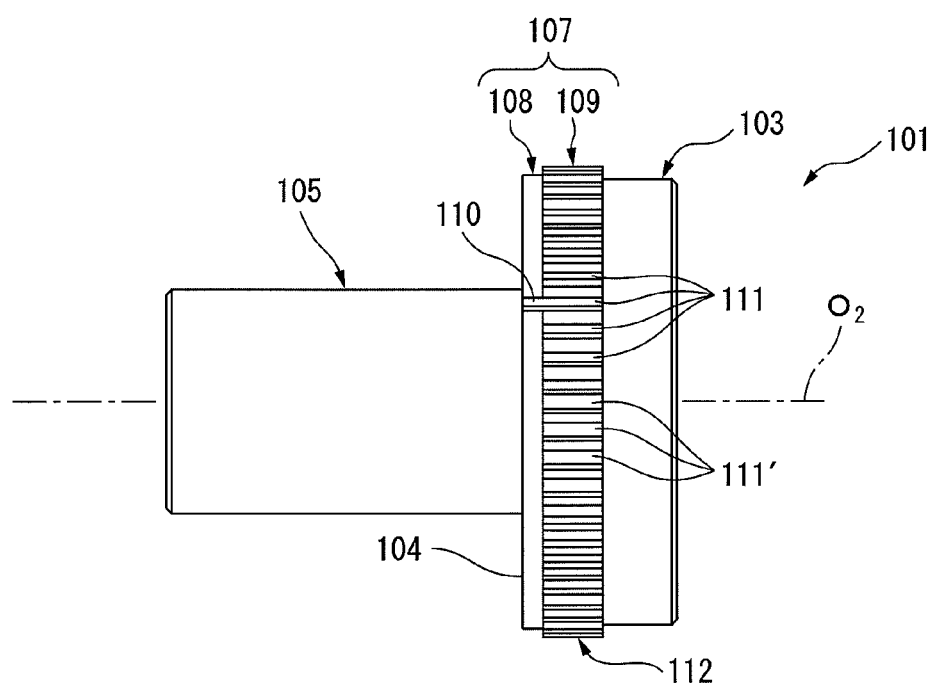
FIG. 3 is a side view of a moving part which is shown in FIG. 1.

Next, referring to FIG. 1 to FIG. 3, the operation of the rotation detector 100 according to the present embodiment will be more specifically explained. When the power output part 14 of the electric motor 11 drives the rotating part 15 to rotate, the moving part 101 also rotates together with the rotating part 15. Then, the detected region 107 formed at the connecting part 103 also rotates relative to the fixed part 102.

With rotation of the detected region 107, the projection 110 of the second detected part 108 passes once a position corresponding to a magnetoresistance element for second detected part 108 disposed in the fixed part 102, during the moving part 101 rotates by one turn. When the projection 110 of the second detected part 108 passes the position corresponding to the magnetoresistance element for second detected part 108, the magnetic field near the magnetoresistance element for second detected part 108 is stronger.

The fixed part 102 detects the change in this magnetic field as a change of the output voltage of the magnetoresistance element and outputs it as an electrical signal which is generated each time the electric motor 11 turns once. The rotation detector 100 outputs the electrical signal as an origin signal (single turn signal) for determining a position serving as the reference for the rotational angle (origin position).

In the same way, with rotation of the detected region 107, the projections 111 of the first detected part 109 successively pass a position corresponding to a magnetoresistance element for first detected part 109 built in the fixed part 102. The fixed part 102 detects the changes of the magnetic field near the magnetoresistance element for first detected part 109 which were generated due to passing the projections 111 as changes of the output voltage of the magnetoresistance element. Then, the fixed part 102 outputs an electrical signal generated exactly the number of times corresponding to the number of projections 111 with each turn of the electric motor 11.

The rotation detector 100 outputs a signal which is obtained by further electrically processing the above electrical signal as an angle signal for detecting the rotational angle of the electric motor 11. Based on the origin signal and angle signal thus obtained, information relating to rotation, such as the rotational angle, rotational position, rotational speed, etc., of the electric motor 11 is obtained.

According to the present embodiment which is provided with the above configuration, it is possible to improve the manufacturing efficiency of the system 10. This will be explained below. Generally, for the rotation detector 100, it is necessary to precisely position the detected region 107 for rotation detection with respect to the fixed part 102, in order to precisely detect rotation of the electric motor 11.

Specifically, the axial direction positions of the first detected part 109 and second detected part 108 of the detected region 107 have to substantially match the axial direction positions of the magnetoresistance element for first detected part 109 and magnetoresistance element for second detected part 108 of the fixed part 102. The tolerance in this case is, for example, about 0.5 mm. Further, the detected region 107 and the fixed part 102 have to be arranged to face each other with a predetermined interval in the radial direction. This interval is set to 0.1 mm. The tolerance of this interval is about 0.02 mm.

As explained above, in the conventional art, the detected part of a rotation detector for which high precision positioning was demanded was produced as an independent ring member separate from the rotation output member fastened to the rotating part of the rotating machine, and then ring member was fit over the rotation output member in the assembly process of the rotating machine. As a result, the process of assembly of a system which is provided with the rotating machine and the rotation detector becomes complicated. This leads to a drop in the manufacturing efficiency of the system.

On the other hand, in the present embodiment, the moving part 101 which constitutes the rotation detector 100 has an output shaft 105 and a detected region 107 formed at the connecting part 103 and is directly fastened to the rotating part 15 of the electric motor 11. In other words, the moving part 101 according to the present embodiment has both the function of detecting rotation of the electric motor 11 and the function of outputting rotational force of the electric motor 11 to an external equipment.

According to this configuration, it is possible to directly form a detected region 107 on the rotation output member (i.e., the moving part 101) which is fastened to the rotating part 15 of the power output part 14 by cutting the stepped part 112 of the connecting part 103 by a precisely controlled method with using e.g., a CNC machine tool.

Due to this, it is possible to eliminate the centering work necessary for precisely positioning the detected region 107 which had previously been necessary. As a result, it is possible to simplify the work, so it is possible to improve the manufacturing efficiency of the system 10. Further, it is easier to raise the concentricity compared with centering of the detected part of a separate member.

Further, in the past, the ring member at which the detected part was provided had to be fastened by bolting etc. to the rotation output member which was fastened to the rotating part of the electric motor. However, according to this embodiment, such bolting work becomes unnecessary and the number of parts can be cut. Further, there is also no rattling between the rotational output member and the detected part due to looseness of the bolts, so the reliability can be improved.

Figure 4:
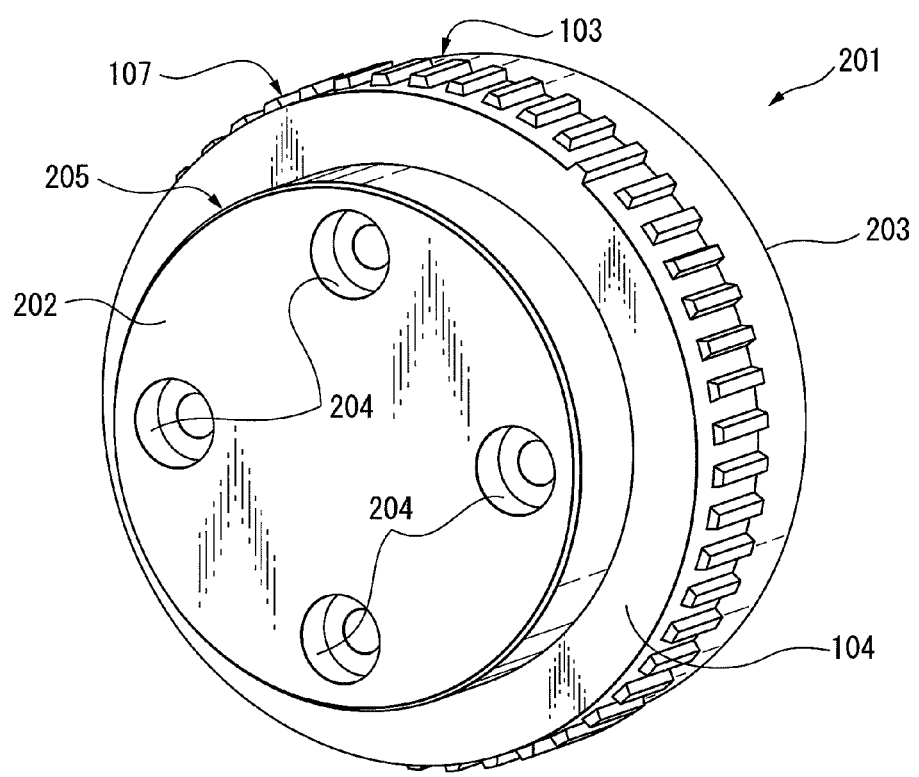
FIG. 4 is a perspective view of a moving part according to another embodiment of the present invention.

Next, referring to FIG. 4, a moving part 201 according to another embodiment of the present invention will be explained. Note that, members similar to the above embodiment are assigned the same reference numerals and detailed explanations will be omitted. The moving part 201 is provided with a connecting part 103 and a columnar shape output shaft 205 which extends from the end face 104 of the connecting part 103 at the front in the axial direction toward the front in the axial direction.

The output shaft 205 has a relatively large outside diameter and small length in the axial direction compared with the output shaft 105 of the embodiment which is shown in FIG. 2. In the present embodiment, a total of four mounting holes 204 are formed so as to be arranged at equal intervals in the circumferential direction and extend from the end face 202 of the output shaft 205 at the front in the axial direction to the end face 203 of the connecting part 103 at the back in the axial direction. The moving part 201 is fastened to the rotating part 15 of the electric motor 11 through four bolts which are passed through the mounting holes 204 and screwed into the rotating part 15 of the electric motor 11.

Figure 5A:
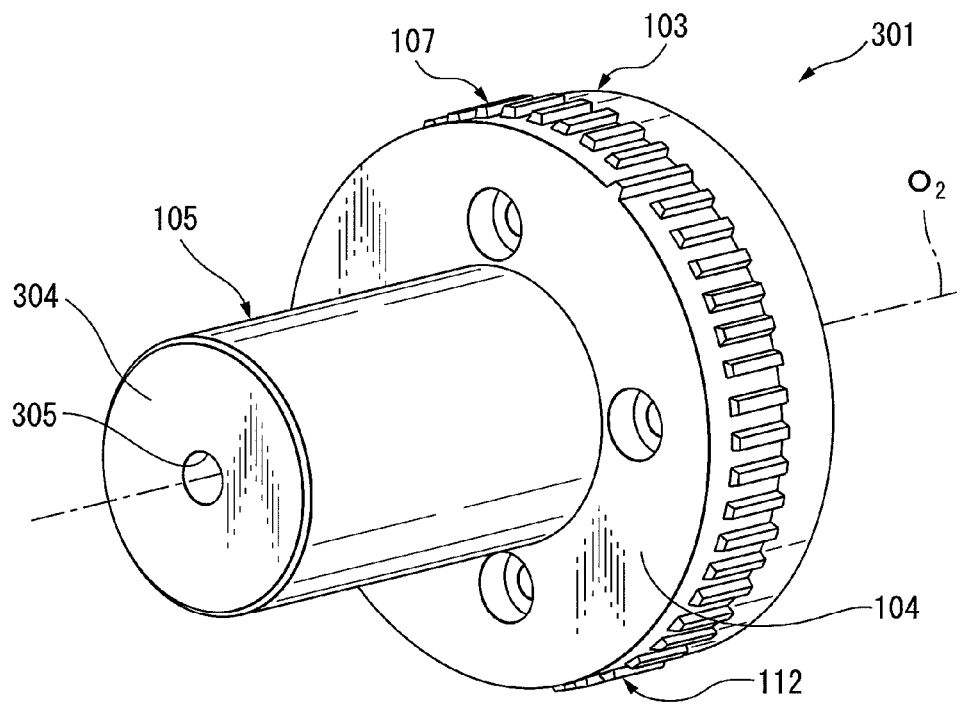
Figure 5B:
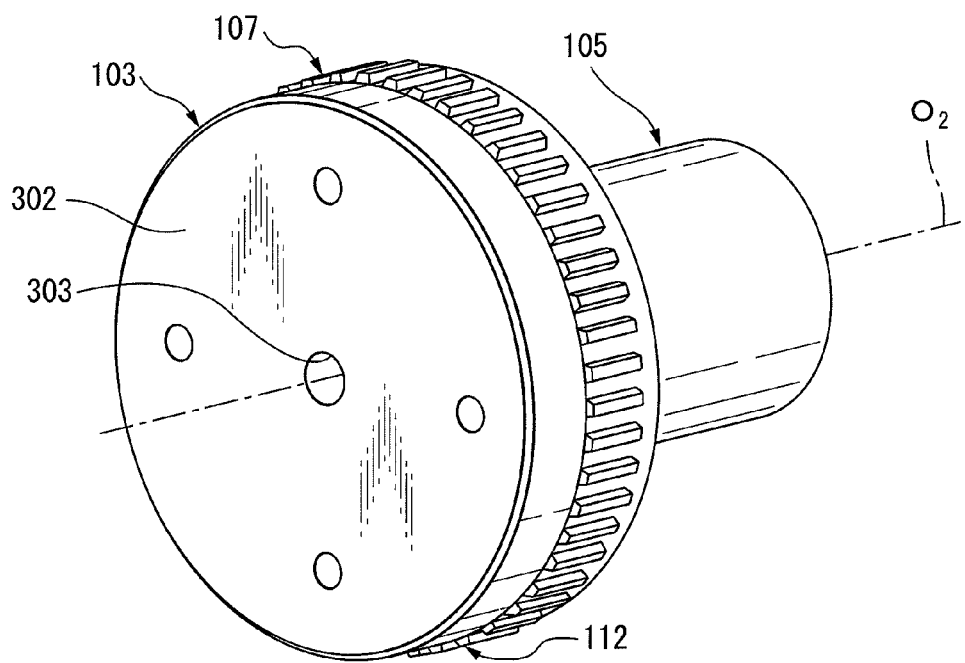

Next, referring to FIGS. 5A and 5B, a moving part 301 according to another embodiment of the present invention will be explained. The moving part 301 shown in FIGS. 5A and 5B has generally the same configuration as the moving part 101 shown in FIG. 2. Specifically, the moving part 301 has a columnar-shaped connecting part 103 fastened in contact with the rotating part 15 of the electric motor 11; and a columnar shape output shaft 105 extending from the end face 104 of the connecting part 103 at the front in the axial direction toward the front in the axial direction.

The moving part 301 has a hole 303 which is inwardly recessed from the end face 302 of the connecting part 103 at the back in the axial direction; and a hole 305 which is inwardly recessed from the end face 304 of the output shaft 105 at the front in the axial direction. These holes 303 and 305 are arranged concentrically with the center axis $O_2$ of the moving part 301. In other words, the centers of the holes 303 and 305 match the center axis $O_2$.

These holes 303 and 305 are formed before the step of forming the detected region 107. When forming the detected region 107 on the stepped part 112 of the connecting part 103, the stepped part 112 of the connecting part 103 is cut by using these holes 303 and 305 as reference. Due to this, it is possible to raise the concentricity with respect to the center axis $O_2$ of the detected region 107 while forming the detected region 107 with a high precision.

Note that, the moving part 301 may have, instead of the above holes 303 and 305, a through hole which extends from the end face 302 of the connecting part 103 to the end face 304 of the output shaft 105. Further, the moving part 301 may have a projection which sticks out from the end face 302 of the connecting part 103 and a projection which sticks out from the end face 304 of the output shaft 105.

Such through holes or projections, like the above holes 303 and 305, are arranged concentrically with the center axis $O_2$ of the moving part 301. In this case, these through holes or projections may be used as references for raising the concentricity with respect to the center axis $O_2$ of the detected region 107 in the step of forming the detected region 107.

Figure 6:
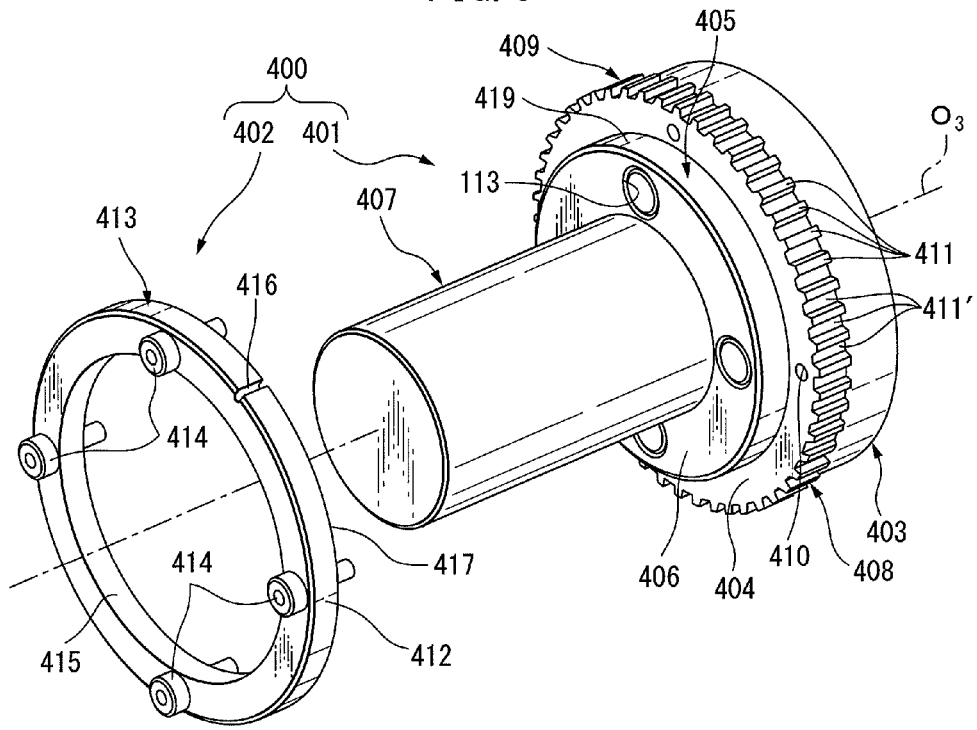
FIG. 6 is a disassembled perspective view of a moving party assembly according to one embodiment of the present invention.
Figure 7:
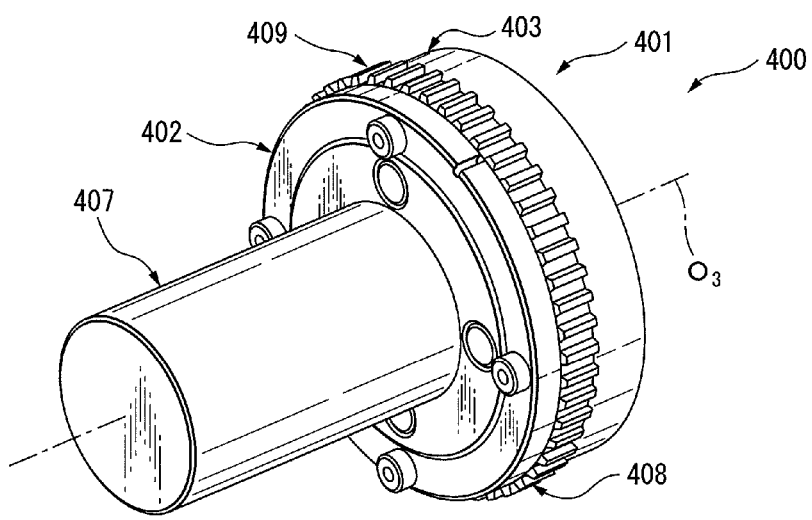
FIG. 7 is an assembled view of a moving part assembly which is shown in FIG. 6.

Next, referring to FIG. 6 and FIG. 7, a moving part assembly 400 according to one embodiment of the present invention will be explained. The moving part assembly 400 is an element which constitutes a rotation detector together with the above fixed part 102 and which is fastened to the rotating part 15 of the electric motor 11. The moving part assembly 400 comprises a first moving part 401 and a second moving part 402.

The first moving part 401 is made of e.g. iron or another such ferromagnetic material. The first moving part 401 includes a columnar-shaped connecting part 403 fastened in contact with the rotating part 15 of the electric motor 11; a columnar-shaped boss part 405 extending from the end face 404 of the connecting part 403 at the front in the axial direction toward the front in the axial direction; and a columnar-shaped output shaft 407 extending from the end face 406 of the boss part 405 at the front in the axial direction toward the front in the axial direction.

The boss part 405 has an outside diameter smaller than the connecting part 403 and a length in the axial direction smaller than the connecting part 403. Further, the output shaft 407 has an outside diameter which is smaller than the boss part 405 and a length in the axial direction which is longer than the boss part 405. The output shaft 407 is a member which outputs the rotational force generated by the power output part 14 to an external equipment (for example, robot arm) which is connected to the electric motor 11.

The connecting part 403, the boss part 405, and the output shaft 407 are arranged concentrically with each other and have a common center axis $O_3$. The part having the maximum outside diameter in the first moving part 401 is the stepped part 408 which is provided at the connecting part 403. On the outer circumferential surface of the stepped part 408, the first detected part 409 is formed. Specifically, the first detected part 409 includes recesses 411' which are recessed inward from the outer circumferential surface of the stepped part 408 of the connecting part 403; and a plurality of projections 411 which have outside diameters same as the stepped part 408.

Each of the projections 411 has a same width in the circumferential direction. The projections 411 are formed so as to be arranged at substantially equal intervals in the circumferential direction over the entire circumference of the stepped part 408 of the connecting part 403. Further, a total of four screw holes 410 are formed at the end face 404 of the connecting part 403.

A total of four mounting holes 113 are formed at the boss part 405 so as to be arranged at equal intervals in the circumferential direction. The first moving part 401 is fastened to the rotating part 15 of the electric motor 11 via four bolts which are passed through the mounting holes 113 and screwed into the rotating part 15 of the electric motor 11.

On the other hand, the second moving part 402 is an annular shape ring member having a common center axis $O_3$ with the first moving part 401 and which is made of iron or another such ferromagnetic material similar as the first moving part 401. The second moving part 402 has a second detected part 413 at its outer circumferential surface 412. Specifically, the second detected part 413 includes a single recess 416 which is recessed inward from the outer circumferential surface 412. Further, the second moving part 402 has a total of four through holes (not shown).

The second moving part 402 is fastened to the first moving part 401 via four bolts 41 which are passed through the through holes and are screwed into the screw holes 410 of the connecting part 403. At this time, the end face 417 of the second moving part 402 at the back side in the axial direction and the end face 404 of the connecting part 403 at the front side in the axial direction are in surface contact, and the inner circumferential surface 415 of the second moving part 402 and the outer circumferential surface 419 of the boss part 405 face each other with a predetermined interval.

When fastening the moving part assembly 400 to the rotating part 15 of the electric motor 11, the moving part assembly 400 is fastened to the rotating part 15 so that the center axis $O_3$ of the moving part assembly 400 and the axis $O_1$ of the electric motor 11 match each other.

The first detected part 409 formed at the first moving part 401 is used for acquiring the above angle signal. On the other hand, the second detected part 413 formed at the second moving part 402 is used for obtaining the above origin signal.

As explained above, the second detected part 413 includes a single recess 416. Therefore, while the electric motor 11 turns once, the magnetic field near the magnetoresistance element for second detected part 413 changes just once. The fixed part 102 arranged radially outside of the second detected part 413 outputs a corresponding electrical signal. In this way, the electrical signal generated by the recess 416 can also be used as the origin signal in the same way as the electrical signal generated by the projection 110 in FIG. 2.

In the present embodiment, the second moving part 402 having the second detected part 413 for acquiring the origin signal is made as a separate member from the first moving part 401. According to this embodiment, it is possible to improve the manufacturing efficiency as a rotation detector, which will be explained below.

If N number of projections 411 is formed in the circumferential direction in the first detected part 409, the fixed part 102 successively outputs N number of the electrical signals generated by the first detected part 409 while the electric motor 11 turns once.

On the other hand, the fixed part 102 outputs one electrical signal generated by the second detected part 413 while the electric motor 11 turns once. Thus, the electrical signals by the first detected part 409 are successively generated over the entire circumference of the stepped part 408.

For this reason, when the center of the first detected part 409 does not match the rotation axis of the electric motor 11 (i.e., when it is off-centered), the cycle of each of the electrical signals continuously change, and as a result, detection error occurs. In order to prevent such detection error, it is necessary to precisely position the first detected part 409 relative to the rotation axis of the electric motor 11.

On the other hand, as explained above, the electrical signal generated by the second detected part 413 is only generated once every turn, and therefore is not significantly influenced even though an eccentricity of the axes of the second detected part 413 and the electric motor 11 is occurred. Accordingly, the second detected part 413 does not have to be as precisely positioned relative to the fixed part 102 as with the first detected part 409.

According to the present embodiment, the first detected part 409 for which precise positioning is demanded is directly formed at the first moving part 401 which is fastened to the rotating part 15 of the electric motor 11, while the second moving part 402 allowed for a relatively wider tolerance is made as a separate member from the first moving part 401 and fastened to the first moving part 401 via bolts with a tolerance of loose fitting.

According to this embodiment, similar as the above embodiment, it is possible to eliminate the centering work of the first detected part 409. Further, the second detected part 413 having a simpler shape than the first moving part 401 can be efficiently mass produced by a separate process from the first moving part 401.

Further, in the above way, by fastening the mass produced second moving part 402 to the first moving part 401 by bolting or other such simple work, a moving part assembly 400 can be assembled. Due to this, the manufacturing efficiency as a rotation detector can be improved.

Next, referring to FIG. 8 and FIG. 9, a moving part assembly 500 according to another embodiment of the present invention will be explained. The moving part assembly 500 comprises a first moving part 401 similar to the embodiment shown in FIG. 6 and a second moving part 502 according to the present embodiment.

The second moving part 502 has a columnar-shaped main part 503 having a second detected part 413; and a columnar-shaped boss part 505 projecting from the axially back end face 504 of the main part 503 toward the back in the axial direction. The second detected part 413 provided at the main part 503 is similar to that of the above embodiment and includes a single recess 416.

The boss part 505 has an outside diameter smaller than the main part 503 and a length in the axial direction smaller than the main part 503. Further, the second moving part 502 has a total of four through holes 506. The second moving part 502 is fastened to the first moving part 401 via bolts 414 which are passed through these through holes 506 and screwed into the screw holes 410 (FIG. 6) which are formed in the first moving part 401.

As shown in FIG. 8, in the state where the moving part assembly 500 is assembled, a groove 507 is formed between the end face 404 of the connecting part 403 at the front in the axial direction of the first moving part 401 and the end face 504 of the main part 503 at the back in the axial direction of the second moving part 502. This groove 507 extends over the entire circumference of the moving part assembly 500 and has a length in the axial direction which corresponds to the boss part 505 of the second moving part 502.

Due to this groove 507, the first detected part 409 provided at the first moving part 401 and the second detected part 413 provided at the second moving part 502 are separated from each other by exactly a distance corresponding to the length in the axial direction of the boss part 505 of the second moving part 502.

By separating the first detected part 409 and the second detected part 413 from each other in this way, the origin signal obtained by the recess 416 of the second detected part 413 and the angle signal obtained by the projections 411 of the first detected part 409 can be detected with a high precision as better separated individual signals.

Figure 10:
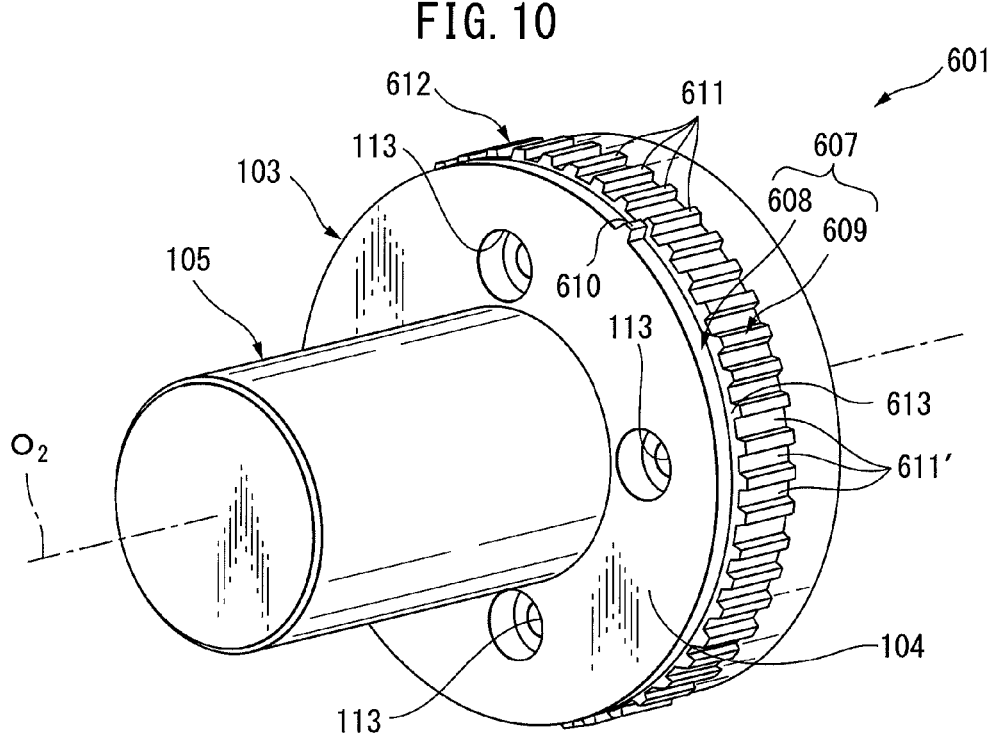
FIG. 10 is a perspective view of a moving part according to still another embodiment of the present invention.
Figure 11:
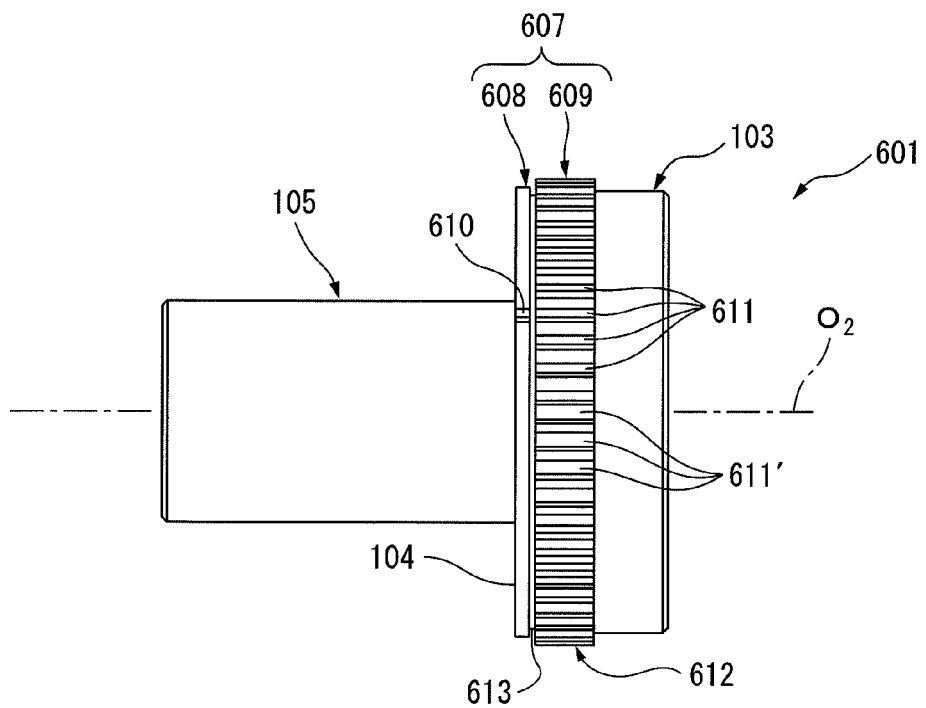
FIG. 11 is a side view of a moving part which is shown in FIG. 10.

Next, referring to FIG. 10 and FIG. 11, a moving part 601 according to still another embodiment of the present invention will be explained. The moving part 601, like in the embodiment shown in FIG. 2, comprises a connecting part 103 and output shaft 105. The part having the maximum outside diameter in the moving part 601 is the stepped part 612 provided at the connecting part 103. The detected region 607 is formed on the outer circumferential surface of this stepped part 612.

Specifically, the detected region 607 includes a second detected part 608 formed adjacent to the end face 104 of the connecting part 103; and a first detected part 609 formed at the back of the second detected part 608 in the axial direction. In the first detected part 609, pluralities of recesses 611' which are recessed inward from the outside surface of the stepped part 612 and projections 611 which have the same outside diameter as the stepped part 612 are formed so as to be alternately arranged.

Each of the projections 611 has same width in the circumferential direction and formed so as to be arranged at substantially equal intervals over the entire circumference of the stepped part 612 of the connecting part 103. On the other hand, in the second detected part 608, only a single projection 610 having the same outside diameter as the stepped part 612 is formed.

In the present embodiment, a groove 613 is formed between the first detected part 609 and the second detected part 608. This groove 613 has a predetermined width in the axial direction and extends in the circumferential direction over the entire circumference of the stepped part 612 of the connecting part 103. Due to this groove 613, the projections 611 of the first detected part 609 and the projection 610 of the second detected part 608 are separated from each other by exactly a distance corresponding to the width in the axial direction of the groove 613.

By arranging the projection 610 and the projections 611 separated from each other in this way, the origin signal obtained by the projection 610 of the second detected part 608 and the angle signal obtained by the projections 611 of the first detected part 609 can be detected with a high precision as better separated individual signals.

Note that, in the above embodiments, the case where the connecting part and output shaft were columnar shaped was explained, but the invention is not limited to this. For example, they may also be polygonal shapes or elliptical shapes or other such shapes.

Further, in the above embodiments, the detected part was explained as including recesses or projections. However, the invention is not limited to this. So long as able to use rotation of the detected part to change the magnetic field between the magnets of the fixed part and the detected part, the detected part may also be of any type. For example, the detected part may have magnets which are arranged in the circumferential direction and may have a material which changes in magnetism in the circumferential direction.

Further, in the above embodiments, the case where the stepped part which was provided at the connecting part was the part which has the maximum outside diameter in the first moving part was explained. However, the invention is not limited thereto. The rotating shaft part may also be the part which has the maximum outside diameter in the first moving part. In this case, the first detected part may be formed at the outer circumferential surface of the rotating shaft part.

Further, in the above embodiments, an electric motor was explained as one example of a rotating machine and the case where the rotation detector according to the present invention was used for detecting the rotation of the electric motor was explained. However, the invention is not limited to this. The rotation detector according to the present invention can detect rotation of a broad range of rotating machines such as generators and heat engines which are driven to operate by combustible fuel.

As explained above, according to the present invention, by precisely cutting the outer circumferential surface of the connecting part, it becomes possible to directly form the detected part on the moving part which is fastened on the rotating part of the rotating machine. Due to this, it is possible to eliminate the centering work necessary for precisely positioning the detected part which had been required in the past. As a result, it is possible to simplify the work of assembling a rotating machine, and therefore it is possible to improve the manufacturing efficiency of a rotating machine.

Further, the moving part which forms part the rotation detector has an output shaft and a detected part, so is provided with both the function of detecting the rotation of the rotating machine and the function of outputting the rotational force of the rotating machine to an external equipment. Due to this, it is possible to reduce the power transmission error due to rattling or backlash which occurs at the time of transmission of rotational force to external equipment.

Further, in the past, the ring member at which the detected part is provided had to be fastened by bolting, etc., to the rotation output member which is fastened to the rotating part of the electric motor, but such bolting work becomes unnecessary and the number of parts can be reduced.

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

The invention claimed is:

1. A rotation detector for detecting rotation of a rotating machine, comprising:
a moving part including:
a connecting part fastened in contact with a rotating part of the rotating machine;
an output shaft separate from the rotating part, the output shaft being formed integrally with the connecting part so as to
extend from the connecting part to one side in the axial direction;
a first detected part formed at a first outer circumferential surface which has a maximum outside diameter in the connecting part and the output shaft; and
a fixed part separated from the first outer circumferential surface at the outside in the radial direction, the fixed part having magnetoresistance elements and detecting a change in a magnetic field which occurs with rotation of the first detected part.

2. The rotation detector according to claim 1, wherein an end face of the output shaft at the one side in the axial direction and an end face of the connecting part at the other side in the axial direction positioned opposite to the end face of the output shaft are provided with a hole or a projection which is concentric with the center of the output shaft and the first outer circumferential surface.

3. The rotation detector according to claim 1, wherein the rotation detector further comprises a ring-shaped second moving part made as a separate member from the moving part, and fastened to the moving part, wherein
the second moving part has a second detected part at a second outer circumferential surface of the second moving part, wherein
the first detected part includes a plurality of recesses or projections which are formed at the first outer circumferential surface so as to be arranged at equal intervals in the circumferential direction, wherein
the second detected part includes a single recess or projection which is formed at the second outer circumferential surface, and wherein
the fixed part detects a change in the magnetic field which occurs with rotation of the first detected part and second detected part.

4. The rotation detector according to claim 1 wherein the moving part has a second detected part integrally formed with the first detected part so as to adjoin the first detected part in the axial direction, wherein
the first detected part includes a plurality of recesses or projections which are formed at the first outer circumferential surface so as to be arranged at equal intervals in the circumferential direction, wherein
the second detected part includes a single recess or projection which is formed at the first outer circumferential surface, and wherein
the fixed part detects a change in the magnetic field which occurs with rotation of the first detected part and second detected part.

5. The rotation detector according to claim 3, wherein a groove is formed between the first detected part and the second detected part so as to extend in the circumferential direction over the entire circumference of the first outer circumferential surface.

6. The rotation detector according to claim 4, wherein a groove is formed between the first detected part and the second detected part so as to extend in the circumferential direction over the entire circumference of the first outer circumferential surface.

7. A system comprising a rotating machine and a rotation detector according to claim 1.

* * * * *